(12) United States Patent
Johnson et al.

(10) Patent No.: US 6,279,110 B1
(45) Date of Patent: Aug. 21, 2001

(54) MASKED DIGITAL SIGNATURES

(75) Inventors: Donald B. Johnson, Manassas, VA (US); Scott A. Vanstone; Minghua Qu, both of Waterloo (CA)

(73) Assignee: Certicom Corporation, Ontario (CA)

( * ) Notice: Subject to any disclaimer, the term of this patent is extended or adjusted under 35 U.S.C. 154(b) by 0 days.

(21) Appl. No.: 08/966,702

(22) Filed: Nov. 10, 1997

(51) Int. Cl.$^7$ ...................................................... H04L 9/30
(52) U.S. Cl. ............................ 713/180; 713/168; 380/30
(58) Field of Search ................................. 713/168, 180; 380/30

(56) References Cited

U.S. PATENT DOCUMENTS

| | | |
|---|---|---|
| 5,271,061 | 12/1993 | Crandall . |
| 5,351,302 | * 9/1994 | Leighton ................................. 380/30 |
| 5,463,690 | 10/1995 | Crandall . |
| 5,581,616 | 12/1996 | Crandall . |
| 5,600,725 | 2/1997 | Rueppel et al. . |

FOREIGN PATENT DOCUMENTS

| | | |
|---|---|---|
| 2129203 | * 1/1996 | (CA) ..................................... 380/30 |
| 0 807 908 | 11/1997 | (EP) . |
| 2 313 272 | 11/1997 | (GB) . |
| 2 321 834 | 8/1998 | (GB) . |

OTHER PUBLICATIONS

Schneier, Applied Cryptology, John Wiley, Chapter 21, Oct. 1995.*
Bruce Schneier, Applied Cryptography, 2e, pp. 33, 70–71, 180, 496–498, 510, Oct. 1996.*
"An Efficient Digital Signature Scheme Based on an Elliptic Curve over the Ring $Z_n$", Tatsuaki Okamoto et al., Aug. 16, 1992, pp. 54–65.

\* cited by examiner

*Primary Examiner*—Gilberto Barron, Jr.
*Assistant Examiner*—James Seal
(74) *Attorney, Agent, or Firm*—Finnegan, Henderson, Farabow, Garrett & Dunner, L.L.P.

(57) ABSTRACT

The present invention relates to digital signature operations using public key schemes in a secure communications system and in particular for use with processors having limited computing power such as 'smart cards'. This invention describes a method for creating and authenticating a digital signature comprising the steps of selecting a first session parameter k and generating a first short term public key derived from the session parameter k, computing a first signature component r derived from a first mathematical function using the short term public key, selecting a second session parameter t and computing a second signature component s derived from a second mathematical function using the second session parameter t and without using an inverse operation, computing a third signature component using the first and second session parameters and sending the signature components (s, r, c) as a masked digital signature to a receiver computer system. In the receiver computer system computing a recovered second signature component s' by combining a third signature component with the second signature component to derive signature components (s', r) as an unmasked digital signature. Verifying these signature components as in a usual ElGamal or ECDSA type signature verification.

11 Claims, 2 Drawing Sheets

MASKED DIGITAL SIGNATURES

BACKGROUND OF THE INVENTION

One of the functions performed by a cryptosystem is the computation of digital signatures that are used to confirm that a particular party has originated a message and that the contents have not been altered during transmission. A widely used set of signature protocols utilizes the ElGamal public key signature scheme that signs a message with the sender's private key. The recipient may then recover the message with the sender's public key. The ElGamal scheme gets its security from calculating discrete logarithms in a finite field. Furthermore, the ElGamal-type signatures work in any group and in particular elliptic curve groups. For example given the elliptic curve group $E(F_q)$ then for $\epsilon E(F_q)$ and $Q=aP$ the discrete logarithm problem reduces to finding the integer a. Thus these cryptosystems can be computationally intensive.

Various protocols exist for implementing such a scheme. For example, a digital signature algorithm DSA is a variant of the ElGamal scheme. In these schemes, a pair of correspondent entities A and B each create a public key and a corresponding private key. The entity A signs a message m of arbitrary length. The entity B can verify this signature by using A's public key. In each case however, both the sender, entity A, and the recipient, entity B, are required to perform a computationally intensive operations to generate and verify the signature respectively. Where either party has adequate computing power this does not present a particular problem but where one or both the parties have limited computing power, such as in a 'smart card' application, the computations may introduce delays in the signature and verification process.

Public key schemes may be implemented using one of a number of multiplicative groups in which the discrete log problem appears intractable, but a particularly robust implementation is that utilizing the characteristics of points on an elliptic curve over a finite field. This implementation has the advantage that the requisite security can be obtained with relatively small orders of field compared with, for example, implementations in $Z_p^*$ and therefore reduces the bandwidth required for communicating the signatures.

In a typical implementation of such a digital signature algorithm such as the Elliptic Curve Digital Signature Algorithm (ECDSA) a signature component s has the form:

$$s=k^{-1}(e+dr) \bmod n$$

where:
- d is a long term private key random integer of the signor;
- Q is a public key of the signor derived by computing the point $Q=dP$;
- P is a point (x, y) on the curve which is a predefined parameter of the system;
- k is a random integer selected as a short term private or session key, and has a corresponding short term public key $R=kP$;
- e is a secure hash, such as the SHA-1 hash function of a message; and
- n is the order of the curve.

In this scheme the signor represents the x coordinate of the point kP as an integer z and then calculates a first signature component $r=z \bmod n$. Next, the second signature component s above is calculated. The signature components s and r and a message M is then transmitted to the recipient.

In order for the recipient to verify the signature (r,s) on M, the recipient looks up the public key Q of the signor. A hash e' of the message M is calculated using a hash function H such that $e'=H(M)$. A value $c=S^{-1} \bmod n$ is also calculated. Next, integer values $u_1$ and $u_2$ are calculated such that $u_1=e'c \bmod n$ and $u_2=rc \bmod n$. In order that the signature be verified, the value $u_1P+u_2Q$ must be calculated. Since P is known and is a system wide parameter, the value $u_1P$ may be computed quickly. The point $R=u_1P+u_2Q$ is computed. The field element x of the point $R=(x_1,y)$ is converted to an integer z, and a value $v=z \bmod n$ is computed. If v=r, then the signature is valid.

Other protocols, such as the MQV protocols also require similar computations when implemented over elliptic curves which may result in slow signature and verification when the computing power is limited. The complexity of the calculations may be explained by observing a form of the elliptic curve. Generally, the underlying elliptic curve has the form $y^2+xy=x^3+ax+b$ and the addition of two points having coordinates $(x_1,y_1)$ and $(x_2,y_2)$ results in a point $(x_3,y_3)$ where:

$$x_3 = \left\{\left(\frac{y_1 \oplus y_2}{x_1 \oplus x_2}\right)^2 \oplus \frac{y_1 \oplus y_2}{x_1 \oplus x_2} \oplus x_1 \oplus x_2 \oplus a \right. \quad (P \neq Q)$$

$$y_3 = \left\{\left(\frac{y_1 \oplus y_2}{x_1 \oplus x_2}\right) \oplus (x_1 \oplus x_3) \oplus x_3 \oplus y_1 \right. \quad (P \neq Q)$$

The doubling of a point i.e. P to 2P, is performed by adding the point to itself so that $$y_3 = \left\{x_1^2 \oplus \left(x_1 \oplus \frac{y_1}{x_1}\right)\right\}x_3 \oplus x_3$$

$$x_3 = x_1^2 \oplus \frac{b}{x_1^2}$$

It may be seen in the above example of the ECDSA algorithm that the calculation of the second signature component involves at least the computation of an inverse. Modulo a number the generation of each of the doubled points requires the computation of both the x and y coordinates and the latter requires a further inversion. These steps are computationally complex and therefore require either significant time or computing power to perform. Inversion is computationally intensive, and generally performed within a secure boundary where computational power is limited thus it would be advantageous to perform such calculations outside the secure boundary, particularly where computational power is more readily available. This however cannot be done directly on the ECDSA signature scheme without potentially compromising the private key information. Therefore there exists a need for a method of performing at least part of a signature operation outside a secure boundary while still maintaining an existing level of security in current signature schemes.

SUMMARY OF THE INVENTION

It is therefore an object of the present invention to provide a method and apparatus in which at least some of the above disadvantages are mitigated.

This invention seeks to provide a digital signature method, which may be implemented relatively efficiently on a processor with limited processing capability, such as a 'smart card' or the like.

In general terms, the present invention provides a method and apparatus in which signature verification may be accelerated.

In accordance with this invention there is provided; a method of signing and authenticating a message m in a public key data communication system, comprising the steps of:

in a secure computer system:
(a) generating a first short term private key k;
(b) computing a first short term public key derived from the first short term private key k;
(c) computing a first signature component r by using the first short term public key;
(d) generating a second short term private key t;
(e) computing a second signature component s by using the second short term private key t on the message m, the long term private key and the first signature component r;
(f) computing a third signature component c using the first and second short term private keys k and t respectively, and sending the signature components (r, s, c) as a masked digital signature of the message m to a receiver computer system; in the receiver system;
(g) using said second and third signature components (s,c) computing a normal signature component $\bar{s}$ and sending the signature components ($\bar{s}$, r) as a normal digital signature to a verifer computer system; and
(h) verifying normal signature.

In accordance with a further aspect of the invention there is provided a processing means for signing a message m without performing inversion operations and including a long term private key contained within a secure boundary and a long term public key derived from the private key and a generator of predetermined order in a field, the processing means comprises:

a secure boundary containing;
a first short term private key generator;
a second short term private key generator;
a first signature component generator using at least the second short term session key. The processor operates to
generate a masked signature component using the first and second short term session keys to produce masked signature components of the message m.

BRIEF DESCRIPTION OF THE DRAWINGS

Embodiments of the present invention will now be described by way of example only with reference to the accompanying drawings in which.

DETAILED DESCRIPTION OF A PREFERRED EMBODIMENT

Figure 1:
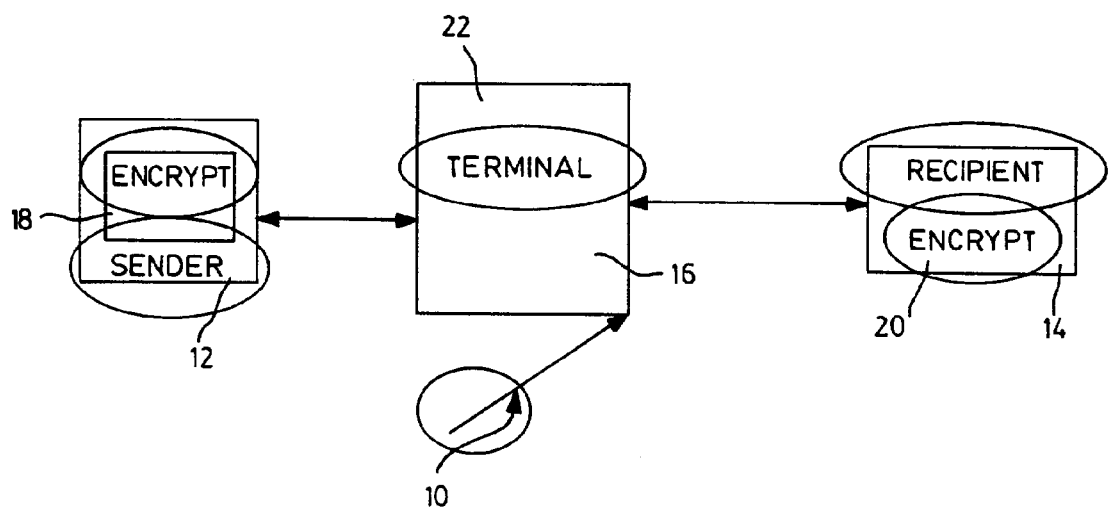
FIG. 1 is a schematic representation of a communication system.

Referring therefore to FIG. 1, a data communication system 10 includes a pair of correspondents, designated as a sender 12, and a recipient 14, who are connected by a communication channel 16. Each of the correspondents 12,14 includes an encryption unit 18,20 respectively that may process digital information and prepare it for transmission through the channel 16 as will be described below. The sender is the party signing a message m to be verified by the recipient. The signature is generally performed in the encryption unit 18 and normally defines a secure boundary. The sender could be a 'smart card', a terminal or similar device. If for example the signor is a 'smart card', it generally has limited processing power. However, the 'smart card' is typically used in conjunction with a terminal 22 which has at least some computing power. The 'smart card' is inserted into a terminal 22 which then forwards digital information received from the 'smart card' 12 along the channel 16 to the recipient 14. The terminal may preprocess this information before sending it along the channel 16.

In accordance then with a general embodiment, the sender assembles a data string, which includes amongst others the public key Q of the sender, a message m, the sender's short-term public key R and a signature S of the sender. When assembled the data string is sent over the channel 16 to the intended recipient 18. The signature S is generally comprised of one or more components as will be described below with reference to a specific embodiment and according to a signature scheme being implemented by the data communication system.

The invention describes in a broad aspect a signature algorithm in which the private key is masked to generate masked signature components which may then be converted to a regular signature prior to the verification of the signature.

Figure 2:
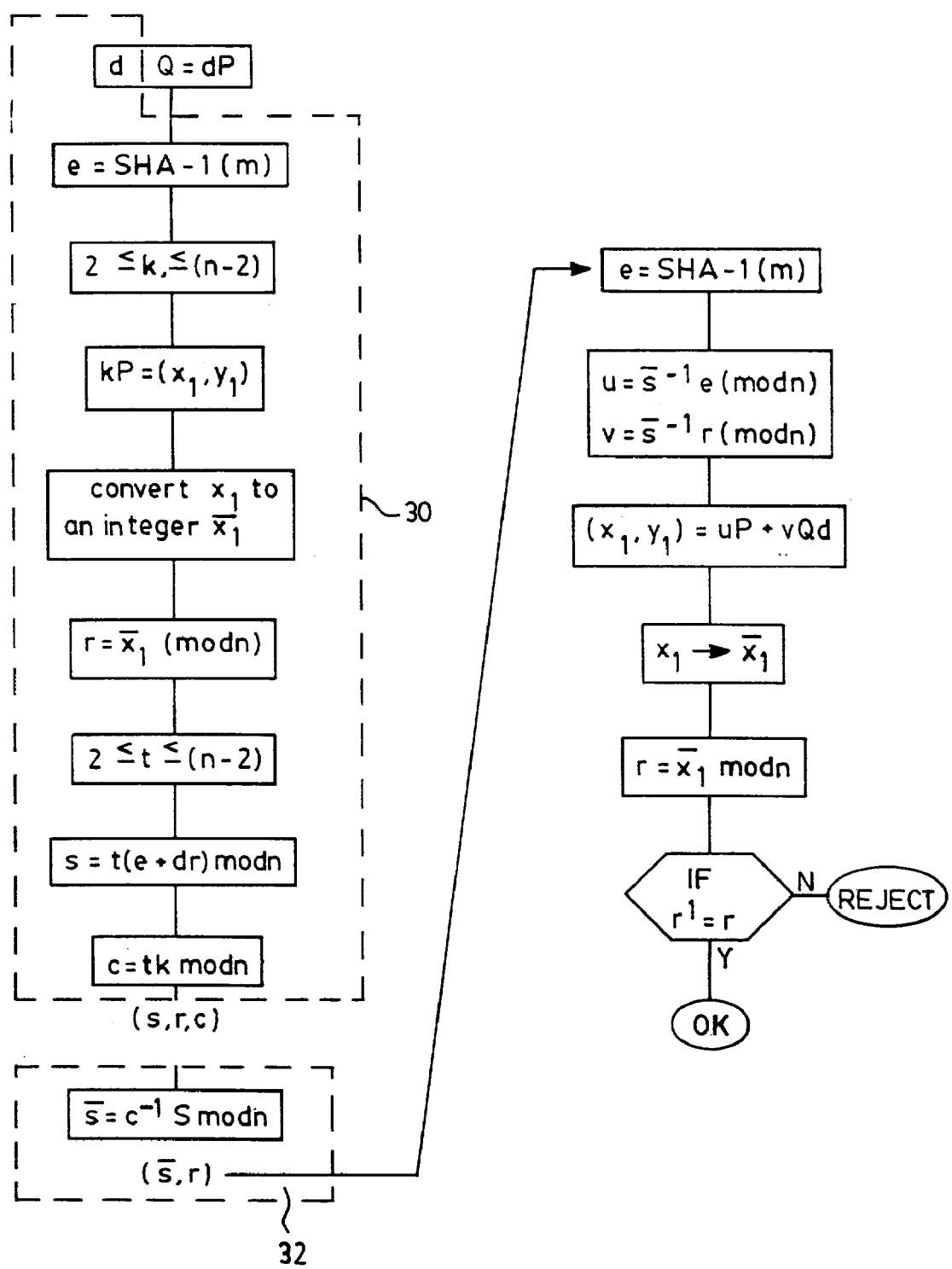
FIG. 2 is a flow chart showing a signature algorithm.

Referring to FIG. 2, it is assumed that E is an elliptic curve defined over Fq, P is point of prime order n in $E(F_q)$, d is the senders private signature key, such that $2 \leq d \leq n-2$, Q=dP is the senders public verification key and m is the message to be signed. It is further assumed these parameters are stored in memory within a secure boundary as indicated by block 30. For example if the sender is a 'smart card', then that would define the secure boundary while for example the terminal in which the 'smart card' was inserted would be outside the secure boundary as indicated at 32. The first step is for the sender to sign the message m. The sender computes a hash value e=H(m) of the message m, where H is typically a SHA-1 hash function. A first statistically unique and unpredictable integer k, the first short term private key, is selected such that $2 \leq k \leq (n-2)$. Next a point $(x_1,y_1)$=kP is computed. The field element $x_1$ of the point kP is converted to an integer $\bar{x}_1$ and a first signature component r=$\bar{x}_1$(mod n) is calculated. A second statistically unique and unpredictable integer the second short-term private key is selected such that $2 \leq t \leq (n-2)$. Second and third signature components s=t(e+dr)(mod n) and c=tk (mod n) respectively are also computed as indicated. This generates the masked ECDSA signature having components (r,s,c). This masked ECDSA signature (r, s, c) may be converted to regular ECDSA signature ($\bar{s}$, r) by computing $\bar{s}=c^{-1}s$ mod n. The ECDSA signature of the sender 12 is then $\bar{s}$ and r. The signature ($\bar{s}$, r) can then be verified as a normal ECDSA signature as described below. Thus the sender can either forward the masked ECDSA signature (s,r,c) to the verifier where the verifier can do the conversion operation to obtain the signature ($\bar{s}$, r) prior to the verification operation or the sender can perform the conversion outside the secure boundary, as for example in a terminal and then forward the DSA signature ($\bar{s}$, r) to the verifier.

Once the recipient has the signature components ($\bar{s}$, r), the recipient can verify the signature by calculating a hash value e=H(m) where this the hash function of the signor and known to the verifier of the message m and then computing u=$\bar{s}^{-1}$e mod n and v=$\bar{s}^{-1}$r mod n. Thus the point $(x_1,y_1)$= uP+vQ may now be calculated. If$(x_1,y_1)$ is the point at infinity then the signature is rejected. If not however the field element $x_1$ is converted to an integer $\bar{x}_1$. Finally the value r'= $\bar{x}_1$ mod n is calculated. If r'=r the signature is verified. If r'$\neq$r then the signature is rejected.

Thus it may be seen that an advantage of the masked ECDSA is that modular inverse operation of the normal ECDSA is avoided for the masked signing operation. As stated earlier this is very useful for some applications with limited computational power. The masked signature to ECDSA signature conversion operation can be performed outside the secure boundary protecting the private key of the sender. For example if the sender was a 'smart card' that communicated with a card reader then this operation could be performed in the 'smart card' reader. Alternatively the masked signature can be transmitted to the verifier, and the verifier can do the conversion operation prior to the verification operation. It may be noted that in the masked ECDSA, no matter how we choose t, we always have $t=ck^{-1}$. Since c is made public, t is not an independent variable.

While the invention has been described in connection with specific embodiments thereof and in specific uses, various modifications thereof will occur to those skilled in the art without departing from the spirit of the invention as set forth in the appended claims. For example in the above description of preferred embodiments, use is made of multiplicative notation, however, the method of the subject invention may be equally well described utilizing additive notation. It is well known for example that elliptic curve algorithm embodied in the ECDSA is equivalent of the DSA and that the elliptic curve analog of a discrete log logorithm algorithm that is usually described in a setting of, $F^*_p$ the multiplicative group of the integers modulo a prime. There is a correspondence between the elements and operations of the group $F^*_p$ and the elliptic curve group E(Fq). Furthermore, this signature technique is equally well applicable to functions performed in a field defined over $F_p$ and $F_{2^n}$. It is also to be noted that the DSA signature scheme described above is a specific instance of the E1Gamal generalized signature scheme which is known in the art and thus the present techniques are applicable thereto.

The present invention is thus generally concerned with an encryption method and system and particularly an elliptic curve encryption method and system in which finite field elements are multiplied in a processor efficient manner. The encryption system can comprise any suitable processor unit such as a suitably programmed general-purpose computer.

We claim:

1. A method of signing and authenticating a message m in a public key data communication system, by a correspondent having a long term private key, d, and a corresponding long term public key derived from said long term private key, d, comprising the steps of:

in a secure computer system;
   (a) generating a first short term private key k;
   (b) computing a first short term public key derived from said first short term private key k;
   (c) computing a first signature component r by using said first short term public key;
   (d) generating a second short term private key t;
   (e) computing a second signature component s by using said second short term private key t on said message m, said long term private key ,d, and said first signature component r;
   (f) computing a third signature component c using said first and second short term private keys k and t respectively, and sending said signature components (r, s, c) as a masked digital signature of said message m to a receiver computer system associated with said secure computer system;
   (g) using said second and third signature components (s,c) to compute a normal signature component s̄ and sending said signature components (s̄, r) as a normal digital signature to a receiver verifer computer system; and in said verifier system
   (h) verifying said normal signature.

2. A method as defined in claim 1, said first short term private key k is an integer and said first short term public key is derived by computing the value $kP=(x_1,y_1)$ wherein P is a point of prime order n in E(Fq), wherein E is an elliptic curve defined over $F_q$.

3. A method as defined in claim 2, said first signature component r having a form defined by r=x̄(mod n) wherein x̄ is derived by converting said coordinate $x_1$ to an integer x̄.

4. A method as defined in claim 3, said second short term private key being an integer selected such that $2 \leq t \leq (n-2)$, and said second signature component being defined by s=t(e+dr)(mod n), wherein e is a hash of said message m.

5. A method as defined in claim 4, said third signature component being defined by c=tk(mod n).

6. A method as defined in claim 5, said normal signature component s̄ being defined by s̄=$c^{-1}$s mod n.

7. A method of generating a digital signature S of a message in a data communication system, wherein the signor of the message has a private key d and a public key y derived from a generator g and said private key d, said method comprising the steps of:

(a) generating a short term private key k;
   (b) computing a first short term public key derived from said short term private key k;
   (c) computing a first signature component r by using said first short term public key;
   (d) generating a second short term private key t;
   (e) computing a second signature component s by using said second short term private key t on said message m, said long term private key and first signature component r;
   (f) computing a third signature component c using said first and second short term private keys k and t respectively;
   (g) sending said signature components (r, s, c) as a masked digital signature of said message m to a receiver computer system.

8. A method as defined in claim 7 including the step of in said receiver computer system, using said second and third signature components (s, r) computing a normal signature component s̄, and sending said signature components (s̄, r) as a normal digital signature to a verifier computer system, and verifying said normal signature (s, r) by said verifier system.

9. A method as defined in claim 8 including the step of in said receiver system, using said second and third signature components (s, c) computing a normal signature component s̄, to derive a normal digital signature components (s̄, r) and; verifying said normal signature components.

10. A processing means for signing a message m without performing inversion operations and including a long term private key contained within a secure boundary and a long term public key derived from said private key and a generator of predetermined order in a field, said processing means comprising:

a generator for generating a first short term private key;
   a generator for generating a second short term private key;
   a generator for generating a first signature component using at least said second short term session key;
   said processor operating to generate a masked signature component using said first and second short private keys to produce masked signature components of said message m.

11. A processing means as defined in claim 10, including a converter to convert said signature components to a normal signature component; and a communication channel for transmitting said normal signature components to a recipient.

* * * * *

UNITED STATES PATENT AND TRADEMARK OFFICE
CERTIFICATE OF CORRECTION

PATENT NO. : 6,279,110 B1
DATED : August 21, 2001
INVENTOR(S) : Donald B. Johnson et al.

It is certified that error appears in the above-identified patent and that said Letters Patent is hereby corrected as shown below:

<u>Column 6,</u>
Line 58, "short private" should read -- short term Private --.

Signed and Sealed this

Twenty-first Day of May, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,279,110 B1
APPLICATION NO. : 08/966702
DATED : August 21, 2001
INVENTOR(S) : Donald B Johnson, Scott A. Vanstone and Minghua Qu It is certified that error appears in the above-identified patent and that said Letters Patent is hereby corrected as shown below:

On the Title page, item (73), "Assignee: CERTICOM CORPORATION, MISSISSAUGA (CA)" should read as --Assignee: CERTICOM CORP., MISSISSAUGA (CA)--

Signed and Sealed this
Twenty-ninth Day of October, 2013

Teresa Stanek Rea
*Deputy Director of the United States Patent and Trademark Office*